United States Patent [19]
d'Alayer de Costemore d'Arc et al.

[11] Patent Number: 6,155,509
[45] Date of Patent: *Dec. 5, 2000

[54] MECHANISM FOR ADJUSTING A SPACING OF TAPE REEL DRIVE MEMBERS FOR DIFFERENT SIZE CASSETTES

[75] Inventors: Stephane M. A. d'Alayer de Costemore d'Arc, Genappe; Veosamouth Sisopha, Brussels, both of Belgium

[73] Assignee: Staar S.A., Brussels, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,009

[22] Filed: Oct. 9, 1996

[30] Foreign Application Priority Data

Oct. 11, 1995 [BE] Belgium ............................ 09500846

[51] Int. Cl.⁷ ............................ G11B 15/68; G11B 23/04
[52] U.S. Cl. ............................ 242/336; 242/338; 360/94
[58] Field of Search .................. 242/336, 338; 360/94

[56] References Cited

U.S. PATENT DOCUMENTS

| | | | |
|---|---|---|---|
| 4,786,996 | 11/1988 | Ohtani et al. | 360/94 |
| 4,791,509 | 12/1988 | Rademacher | 360/94 |
| 5,109,309 | 4/1992 | Ohoka et al. . | |
| 5,231,553 | 7/1993 | Weber et al. | 360/94 X |
| 5,314,141 | 5/1994 | Ishii et al. | 360/94 X |
| 5,357,385 | 10/1994 | Shimizu et al. | 360/94 X |
| 5,396,381 | 3/1995 | Yamano et al. | 360/94 X |
| 5,402,405 | 3/1995 | Shiomi | 369/77.1 |

FOREIGN PATENT DOCUMENTS

| | | |
|---|---|---|
| 3327403 | 4/1985 | Germany . |
| 4223938 | 1/1994 | Germany . |
| 2164193 | 3/1986 | United Kingdom . |

*Primary Examiner*—Daniel P. Stodola
*Assistant Examiner*—Gregory J. Strimbu
*Attorney, Agent, or Firm*—Leydig, Voit & Mayer

[57] ABSTRACT

A multi-cassett loading and unloading system having a housing which has defined locations for different size cassettes such as the Standard (large size) and Mini (small size) cassettes of the DVC (digital video) format, which are distinguished by different center-to-center spacing of the tape reels. The housing is movable horizontally and vertically during the loading and unloading operations. An element of a connection between the housing and a mobile member engages and thereby detects which size cassette is in the housing. A linkage between the mobile member and the driving members adjusts a spacing of the driving members responsive to horizontal translation of the mobile member by the housing. When a large size cassette is being loaded, it is engaged and detected by the element, and the connection is disabled which causes the mobile member to set the spacing of the driving members to match the spacing of the tape reels of the large size cassette and, when a small size cassette is being loaded, it is engaged and detected by the element, and the connection is enabled by the element engaging an abutment on the housing which causes the mobile member to be translated by the housing and set the spacing of the driving members to match the spacing of the tape reels of the small size cassette. In a disclosed embodiment, the element takes the form of a pressure roller which pushes the cassette in the housing on reference supports as the housing is moved vertically to lower the cassette into engagement with the driving members.

26 Claims, 4 Drawing Sheets

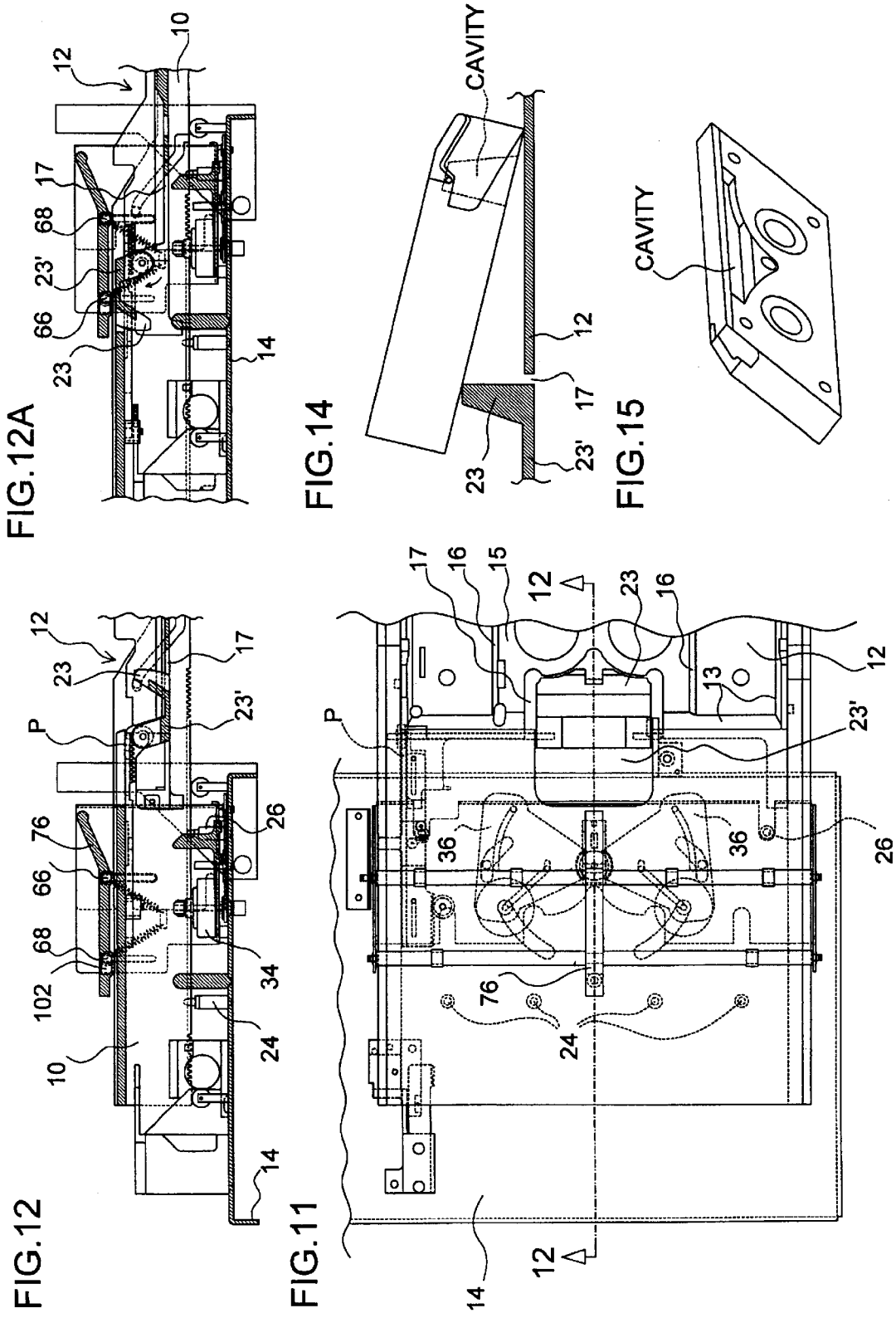

MECHANISM FOR ADJUSTING A SPACING OF TAPE REEL DRIVE MEMBERS FOR DIFFERENT SIZE CASSETTES

RELATED APPLICATION

This application is related to application Ser. No. 08/731,011, filed Oct. 9, 1996, entitled Centering mechanism for Multi-Cassette Loading/Unloading System, now U.S. Pat. No. 5,788,174.

FIELD OF THE INVENTION

The present invention relates to systems for loading/unloading cassettes in apparatus which records and/or plays back information on information carriers housed in cassettes and more particularly to loading/unloading systems operable with cassettes of different sizes.

BACKGROUND OF THE INVENTION

Loading/unloading mechanisms have been developed for loading/unloading cassettes through an introduction slot, e.g. as disclosed in U.S. Pat. No. 5,314,141, in which a housing receives a cassette, the housing performing a horizontal, then a vertical movement. Such mechanisms have proven to be poorly suited to operate with different size cassettes having a substantial discrepancy in width because when a large-size cassette is securely held in the housing, then the edge of a small-size cassette barely protrudes from it and thus proves difficult to be gripped by the user or when the edge of a small-size cassette protrudes sufficiently so that the cassette can easily be gripped at the edge by the user, then the large-size cassette is not securely held in the unit because of a very large overhang. In addition, the device actuating the elements of the unit to be adapted to the size of the inserted cassette can be positioned only laterally with respect to the housing holding the cassette, something not always convenient. Further, the different cassettes of a same family must have almost the same thickness.

To deal with such drawbacks, housings have been designed for undergoing a single movement to transfer the cassette to its operative position. For example, German application DE 33 27 403 discloses a device including a mechanical feeler mounted in the housing receiving the cassette, the housing performing just a vertical movement; U.K. application 2,164,193 discloses a mechanism embodying rails linked by a parallelogram linkage which can be displaced for scanning the format of the cassette inserted in a cover which is then pivoted. Such housings either incorporate a rather complex mechanism to scan the format or size of the inserted cassette or the too long length of their stroke, which is required for adjusting components of the unit; accordingly, mechanisms with such housing are objectionable because of complexity or cost.

In order to overcome the above-mentioned draw-backs, one loading/unloading system has been proposed embodying a "drawer" incorporating either a dedicated housing for each size of cassettes such as disclosed in the European application EP 0 398317 or a single housing which incorporates positioning and/or driving means for a small-size cassette such as described in the European application EP 0 415411. Such loading/unloading systems respectively occupy too large a volume and are rather complicated and accordingly, neither has achieved significant commercial success.

SUMMARY OF THE INVENTION

Accordingly, the main object of the present invention is to overcome the above-mentioned drawbacks by providing an improved, simple, reliable and compact loading/unloading system which is capable of operating with cassettes of different sizes (in their three dimensions) and is effective in simultaneously adapting the driving, recording and/or playback elements of the apparatus to the size of the inserted cassette.

A further object of the present invention is to utilize and modify mechanisms already existing in systems here-to-fore designed for loading/unloading single-size cassettes and provide an improved system for loading/unloading different-size cassettes while minimizing increase in the number of parts and thus in costs of the installed systems.

A further object of this invention is to incorporate such an improved multi-cassette loading/unloading system in existing apparatus designed for single size loading/unloading systems cassette while avoiding any increase in the required volume or overall height of the installed systems.

Further advantages and features will appear from the following description of a most preferred embodiment, and to which further improvements and modifications can be brought without departing from the scope of the invention, in conjunction with the drawings.

BRIEF DESCRIPTION OF THE DRAWINGS

FIGS. 11, 12 and 12A are top and lateral sectional views (taken in the plane of lines 12-12 in FIG. 11) schematically showing a cassette centering mechanism incorporated in the system of FIG. 1, the centering tab being shown in the centering position in FIG. 12 and rotated to non-interfering position in FIG. 12A.

FIG. 14 is a view illustrating a mis-presented cassette rejected by the tab; and FIG. 15 is a perspective view of a DVC cassette illustrating the standard cavity.

DETAILED DESCRIPTION

For clarity and simplicity, only the elements required for the understanding of the invention appear in each one of the figures.

Figure 13:
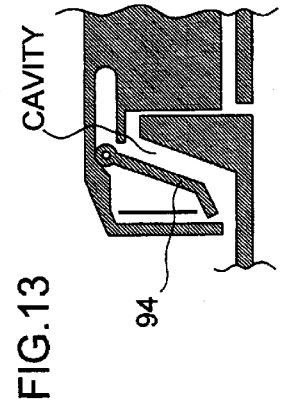
FIG. 13 is an enlarged fragmentary view of a DVC cassette with the centering mechanism tab received in the cassette cavity.

In the described embodiment, the loading/unloading system is constructed to receive two different size cassettes of the three (Mini, Professional and Standard) different size cassettes of the DVC (Digital Video Cassette) format. The Standard DVC cassette has a recording capacity of four hours. The Mini DVC cassette has the shortest recording capacity while the Professional DVC cassette has a recording capacity almost halfway between the Mini and Standard DVC cassette. The housings or shells of all three DVC cassettes are substantially of the same thickness, are parallelepiped, but in plan view the shells are of different size. The Standard DVC cassette is the largest, the Mini DVC cassette is the smallest and the Professional DVC cassette is intermediate in size in plan view. Similarly, the center-to-center spacing of the tape reels are different for the three DVC cassettes; respectively, they have largest, smallest and intermediate tape reel spacing. Referring to FIG. 15, this represents any DVC cassette which includes a cavity (labeled CAVITY) in the bottom or lower face of the shell at the front portion; when the cassette is located in operative position, the shutter 94 shown in FIG. 13 is pivoted to allow access to the information support, and components penetrate the cavity including, among others, guides ensuring loading of the information support which is around the drum supporting the playback/recording heads, a sector of the drum, shafts, capstan, pressure rollers and any other elements which cooperate with the information support, in the DVC cassette, a magnetic tape. For all cassettes of the same format or standard, e.g. the DVC format, a similar standard cavity is provided which has the same size, shape and profile and is positioned at the same location whatever the size of the cassette (Standard, Professional, Mini).

Figure 1:
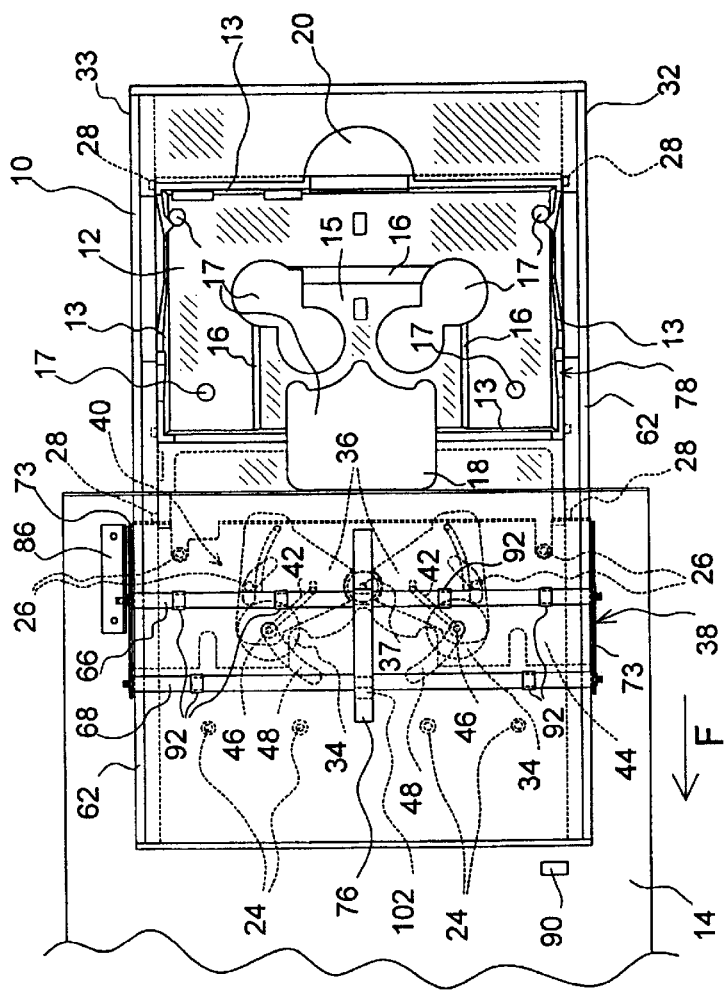
FIG. 1 is a top view of a loading/unloading system incorporating the invention, set in its loading/ejected position, no cassette being loaded.
Figure 2:
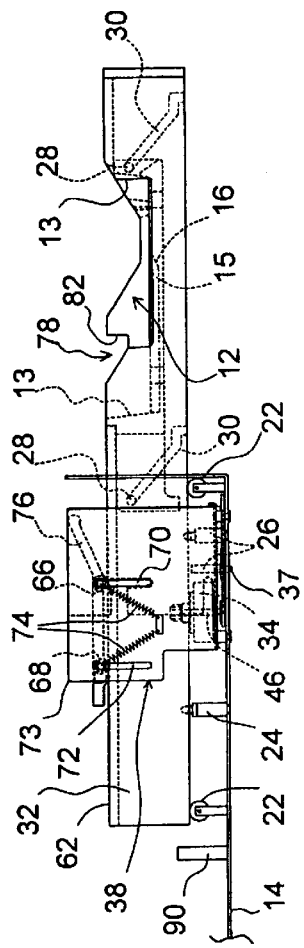
FIG. 2 is a lateral end view of the mechanism appearing in FIG. 1.

Turning now to FIGS. 1 and 2, in accordance with the invention, the loading/unloading system comprises a drawer 10 incorporating a vertically movable housing 12, which has an overall size in plan view a little bit larger than that of the largest cassette of the format to be accommodated (herein, the Standard DVC), said housing including peripheral walls 13 providing a boundary defining a location for such a cassette and standing slightly tilted outwards to ensure easy and accurate centering of an inserted cassette. This housing 12 also includes in its front portion, close to the main frame 14 of the unit, a shallow recess 15 in the bottom wall of the housing 12 defining a location for a small cassette and having peripheral walls 16 slightly tilted outwards and spaced to provide a boundary just slightly larger than the smallest cassette to be accommodated (herein, the Mini DVC). It will be recognized that the Professional DVC cassette could be accommodated in place of either the Standard or Mini DVC cassettes, in a unit designed for two DVC cassettes, by spacing the peripheral walls 13 or 16 to fit the size in plan view of the Professional DVC cassette.

To provide a unit capable of receiving all three DVC cassettes, a second shallow recess would be provided having a boundary defining a location intermediate in size between the recess 15 and the location defined by the peripheral walls 13.

Hereinafter, a first or large cassette is intended to mean a cassette of the largest size of a given format to be accommodated and a second or small cassette is intended to mean a cassette of a smaller size of the same format.

Further, openings 17 are provided in the bottom wall of the housing 12 which allow passage of all elements having to cooperate with cassettes of all sizes when in the operative position and the information carrier enclosed in it, such as the above-mentioned elements and means including the driving means for the information carrier and playback/recording means.

Apertures 18,20 close to the housing 12 are provided in the drawer 10 to enable a user to easily pick-up by one's fingers and remove any cassette therefrom. The drawer 10 is supported in its horizontal plane by rollers 22 fixed on the main frame 14 and is driven inward from the loading/ejected position and returned outward by an electric micro-motor and a gear-train, elements both well-known in the art and thus not shown.

In the best mode, the loading/unloading system of this invention also includes a centering mechanism movably supported in the bottom openings 17 in the housing 12. As shown in FIGS. 11–13 the centering mechanism includes an upwardly projecting tab 23 defining a profile which approximately matches the profile of the standard cavity in the bottom face of any DVC cassette. The centering mechanism tab 23 is received in the cavity of a DVC cassette when properly presented and placed on the bottom of the housing 12. If a cassette is mis-presented (i.e. wrong end first or upside down), whether a large cassette placed by the user within the walls 13 or a small cassette placed within the recess 15, the tab 23 is located such that it engages the bottom of the cassette and tilts it upwardly at an angle (as shown in FIG. 14) which indicates to and warns a user it is obviously mis-presented and, in effect, rejects the cassette and guards against the cassette being introduced into the unit where it could damage the internal components. Furthermore, having the tab 23 insures that a cassette is accurately centered in either the recess 15 if a small cassette or within the walls 13 if a large cassette after being placed in the housing 12 for the loading operation. In its preferred form, the tab 23 is carried on a movable support 23' which is rotated clockwise (as shown by the arrow in FIG. 12A) to pivot 180 degrees under the bottom of the housing 12 as the housing is translated during the loading operation to a non-interfering position shown in FIG. 12A, which removes the tab 23 from the cassette to a position clear of the cassette and the tape driving and recording/playback means which access the tape when the cassette is in operative position thereby avoiding interference therewith. The centering mechanism shown herein somewhat schematically in FIGS. 11–13 is shown and described in detail in the related application referred to above, entitled Centering Mechanism For Multi-Cassette Loading/Unloading System, which application is incorporated by reference and may be referred to for a more complete explanation.

The loading/unloading system is constructed such that a cassette of any size accommodated, properly placed and positioned in a defined location in the housing 12 of the drawer 10, is translated inward from the loading/ejected position and lowered vertically downward onto the reference members 24,26 to an operative position and into cooperative relation with playback/recording heads and information carrier (tape) driving means. The housing 12 bears at its extremities (FIG. 2) four horizontal studs 28 which engage and cooperate with inclined grooves 30 inside the lateral walls 32,33 of the drawer 10 to allow vertical movement of the housing 12 relative to the drawer 10 so as to lower an inserted cassette onto reference members 24,26 as a result of the loading movement or raise a cassette from said members before ejecting it from the unit. The driving means for the cassette reels, herein shown as drive spindles 34, which project through the openings 17 in the housing when the cassette is in operative position, are variably-spaced and carried on supports in the form of triangular plates 36 which are mounted to rotate about a common shaft 37 attached to the main frame 14. The spacing of the drive spindles 34 is adjustable to match the center-to-center distances, i.e. the cassette-reel spacing, of the reels of the different size cassettes accommodated in the apparatus by rotating the triangular plates 36.

Figure 10:
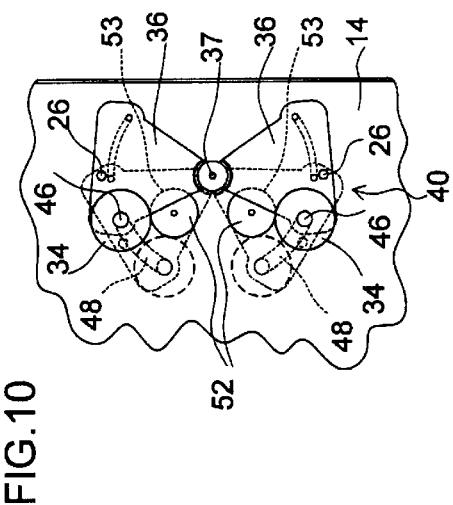
FIG. 10 is a detail of the support assembly for the cassette-reel drive spindles appearing in FIGS. 1 to 6, shown in its two operative positions.

In keeping with the invention, to rotate the triangular plates 36 which support the drive spindles 34, a U-shaped mobile member 38 which is connected for translational movement by the drawer 10 is linked to the triangular plates 36 by two symmetrical grooves 42 provided in a bottom plate 44 (FIG. 1) of the mobile member 38 which receive the vertical passage of shafts 46 rotatably supporting the drive spindles 34, the shafts 46 also projecting below the triangular plates 36 into and being guided by a pair of arcuate slots 48 in a bottom member of the main frame 14. The symmetrical grooves 42 in the plate 44 interacting with the vertical shafts 46 and the arcuate slots 48 form a linkage 40 between the mobile member 38 and the triangular plates 36 which rotates the triangular plates upon translation of the mobile member 38, the triangular plates 36 having a first position (shown in solid lines in FIG. 10) wherein the drive spindles 34 are set at a first center-to-center spacing for a first or large cassette such as a large Standard DVC cassette and a second position (shown in dash lines) wherein the drive spindles 34 are set at a second center-to-center spacing for a second or small cassette such as a Mini DVC cassette. Movement of the mobile member 38 in the loading direction of the drawer 10 (arrow F in FIG. 1), or in the opposite unloading direction, as a consequence of the linkage 40 to the triangular plates 36, results in a shift of the drive spindles 34 between one position and the other (FIG. 10).

Further in keeping with the invention, a connection is provided between the drawer 10 and the mobile member 38 which is enabled to cause translation of the mobile member 38 by the drawer 10 when a second or small (Mini) size cassette is located in recess 15 in the housing 12 and the drawer is moved in the loading/unloading operation to load/unload the second size cassette to/from its operative position. Thus, the mobile member 38 is effective to set the spacing of the drive spindles 34 for the cassette reels which carry the tape, to match the center-to-center distance of the cassette reels of the particular size cassette being loaded by the mechanism. The drive spindles 34 can be driven either directly and separately by an electric motor or by gears 52 set in such a way that their periphery 53 always meshes with the periphery of the drive spindles 34 when the latter are moved from one position to the other. The triangular plates 36 are sandwiched between a horizontal member of the main frame 14 and the horizontal bottom plate 44 of the mobile member 38 and simultaneously rotate when actuated by the mobile member 38 which is supported for translation on the bottom member of the main frame 14.

According to the most preferred embodiment of the invention, means are provided cooperating with the cassette or cartridge, when located in the drawer 10, and with the upper edges 62 of the lateral walls 32,33 of the drawer 10, to coordinate the movement of the drawer 10 and the movement of the mobile member 38 in the adjusting of the spacing of the driving means for the cassette reels, by providing the connection between the drawer 10 and mobile member 38 which is enabled so that the mobile member 38 is translated by the drawer 10 when a small cassette (in the present embodiment) is located in the drawer 10. Thus, the spacing of the drive spindles 34 is set at the greater center-to-center distance of reels of a first or large (Standard) DVC cassette when the mobile member 38 is located in a first position as shown in FIG. 1. By means of the connection, the mobile member 38 is translated and via the linkage simultaneously rotates the triangular support plates 36 for the drive spindles 34 to set the drive spindles 34 at the spacing corresponding to the center-to-center distance of reels of a second small cassette during the loading operation of the small cassette by the drawer 10.

Figure 8:
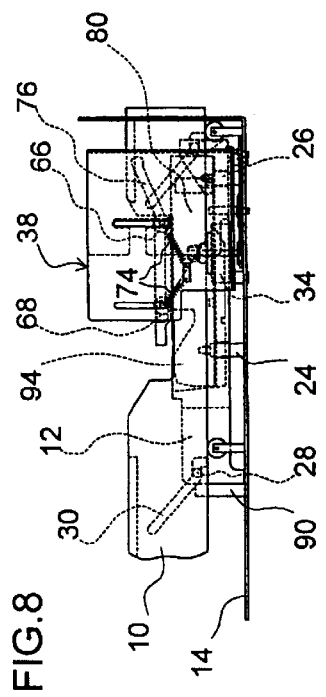
FIG. 8 is similar to FIG. 4, the cassette being in its operative position.

In the present case this connection is provided by one of two horizontal rollers 66,68 which are free to rotate being supported at their ends in vertical slots 70,72 in the lateral walls 73 of the mobile member 38. These rollers 66,68 also serve the function of pressing the cassettes during the loading operation toward the reference members 24,26 which accurately set their operative level with respect to elements such as the record/playback heads and driving means (FIG. 8). As shown, the elongated rollers 66,68 undergo the action of resilient means herein shown as springs 74 pulling them down towards the main frame 14. A lever 76 is connected to both rollers 66,68 (FIG. 9), the first roller 66 serving as a pivot, the second roller 68 as a driver.

Figure 6:
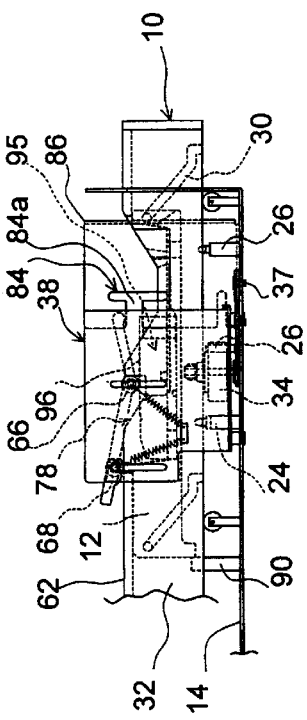
FIG. 6 is similar to FIG. 4, the mechanism being in the position shown in FIG. 5.

In carrying out the present invention, the rollers 66,68 cooperate with the drawer 10 and the housing 12. As shown in FIG. 2, the periphery of the two rollers 66,68 rests on the upper edge 62 of the lateral walls 32,33 of the drawer 10, the profile of which (FIGS. 2, 4, 6) is horizontal and then inclined in the vicinity of notches 78 located laterally in each lateral wall of the housing, to allow said rollers 66,68 to stay clear of or cooperate with the housing of a cassette located in the housing 12.

Figure 3:
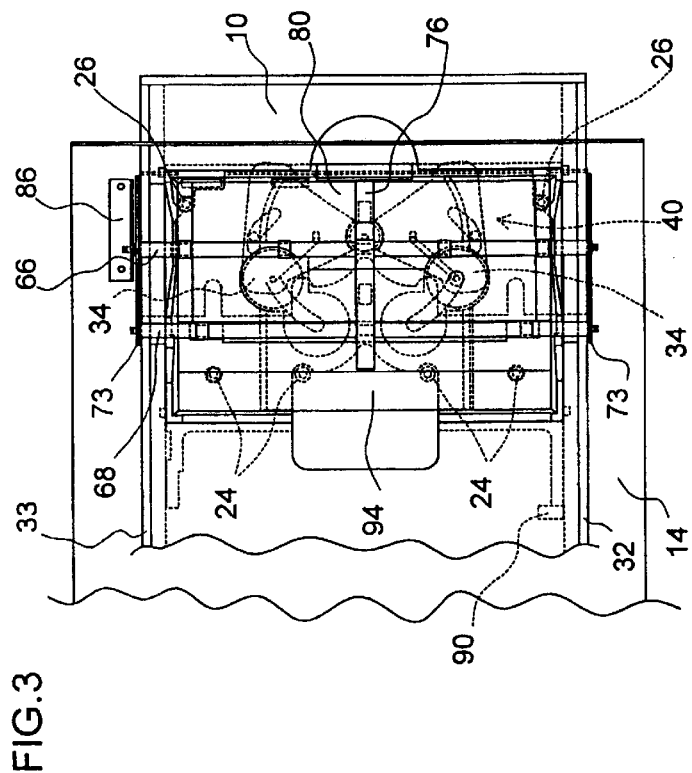
FIG. 3 is similar to FIG. 1, the mechanism having transferred a cassette of a large-size just above its operative position.
Figure 4:
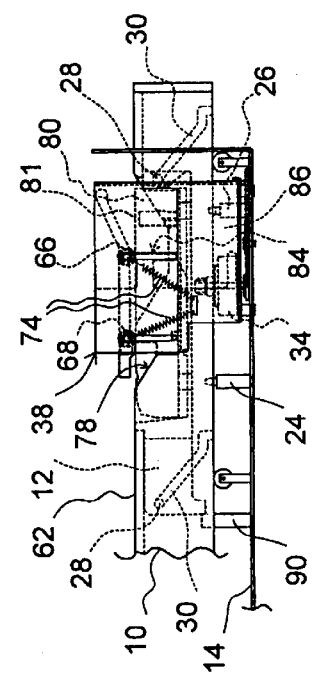
FIG. 4 is similar to FIG. 2, the mechanism being in the position shown in FIG. 3.

When a large size cassette 80 is placed in the housing 12, upon inward movement of the drawer 10 (FIGS. 3, 4), both rollers 66,68 leave the profile of upper edges 62 of the walls 32,33 of the drawer 10 and engage the upper surface 81 of the cassette 80. The drawer 10 is shown in FIGS. 3,4 partially inside the unit. As disclosed in the above-mentioned related application and as shown schematically in FIGS. 11–13, the movable support 23' for the centering mechanism tab 23 is rotated 180 degrees from the centering position of FIG. 12 to the non-interfering position shown in FIG. 12A, preferably by means P powered by the drawer, as the drawer 10 is translated inside the unit, to remove the tab 23 from its centering position received in the cassette cavity, to avoid interfering with the tape driving and playback/recording means. The pressure rollers 66,68 in addition to their other functions serve to press the cassette in place in the housing 12 and hold the cassette during the loading operation and until brought into engagement with the reference supports 24,26 and guide elements which fix the cassette in the operative position for the recording/playback operations.

Figure 7:
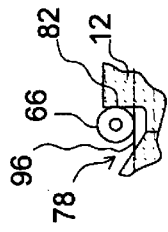
FIG. 7 is a detail of some elements appearing in FIG. 6.

The level of the upper surface 81 of the cassette 80 being slightly higher than the top surface of the housing 12, neither of the rollers 66,68 engages any surface of the housing 12 and, more particularly, is clear of surfaces of the notches 78 including their vertical edge 82 (FIG. 7). As a result, the mobile member 38 remains in the position shown in FIG. 4 and, in the most preferred embodiment, the mobile member 38 is retained in such position due to the cooperation of the roller 66 with a groove 84 provided in a retainer in the form of a lateral vertical plate 86 mounted to the drawer 10. This groove 84 (FIG. 9) has a T shape, as viewed from the side, and the roller 66 can exit only when at the level of a horizontal section 84a of the groove 84. In the case of a large size cassette or no cassette at all, the roller 66 stays in the vertical sections 84b or 84c of the groove 84 preventing any displacement of the roller 66 (FIG. 4).

Near the end of the stroke of the drawer 10, the front part of the housing 12 comes against an abutment 90 mounted on the main frame 14 and any further translation of the drawer 10 powers, through the studs 28 guided by the grooves 30, the lowering of the housing 12 and the cassette 80. The rollers 66,68 undergoing only the influence of the resilient means 74 push the cassette 80 onto its reference supports 24,26 with a specified pressure (FIG. 8). As can be seen, by using spaced rubber bands 92 added to the rollers 66,68, pressure may be applied to the upper surface 81 of the shell of the large cassette 80 (or in the case of the small cassette) where the established standard requires: where the cassette shell is reinforced by thicker side walls, while allowing opening of the shutter 94 protecting the information carrier.

Figure 5:
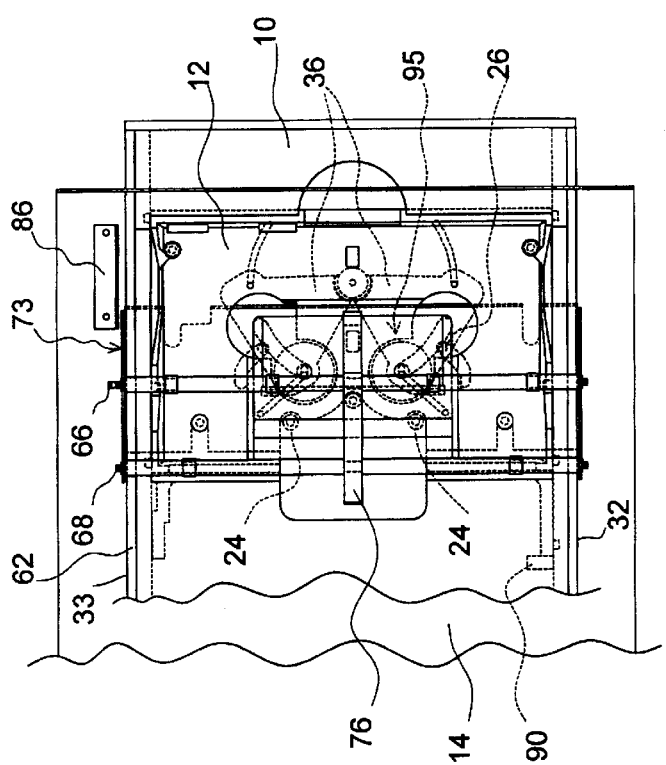
FIG. 5 is similar to FIG. 3, the cassette being of a smaller size.

When a small size cassette 95 is placed in the recess 15 of the drawer 10, upon inward movement (FIGS. 5, 6) of the drawer 10, the roller 68 stays on the horizontal portion of the upper edge 62 of the walls 32,33 while the other roller 66 enters the region of the notches 78 and drops in level to cooperate with the upper surface 96 of the shell of the small cassette 95. Its level then corresponds to that of the horizontal section 84a of the groove 84 and, accordingly, the roller 66 is free to exit from the retainer plate 86. Because the cassettes 80,95 are set on reference supports 24,26 in their operative position, it is advantageous for improving the efficiency of the present device in correctly setting the drive spindle spacing to fix the bottom of the housing 12 and the bottom of the recess 15 at different levels sufficiently spaced apart so that the corresponding difference in levels between the upper surfaces 81,96 of the different cassettes insures the appropriate setting of the drive spindle spacing. By spacing apart the levels of the bottom walls of the housing 12 and the recess 15 (and the levels of additional recesses, if present), the mechanism of this invention is capable of discriminating cassettes of a family having substantially the same thickness. In a working prototype, for example, the bottom wall of the recess 15 was set 3.1 mm below the bottom wall of the housing 12.

As noted above, cassettes of the DVC format or family have substantially the same thickness which is set as an Industry standard for this type cassette and which permits a difference in thickness of several mm to accommodate variations in construction details such as wall thickness. To illustrate, a Standard DVC cassette was measured to have a thickness of 14.6 mm and a Mini DVC cassette was measured to have a thickness of 12.2 mm which in the sense of this description are representative cassettes of substantially the same thickness.

Turning now to FIG. 7, as the height of a small cassette 95 in the recess 15 is lower than the height of the notch 78 the roller 66 moves into abutting relation with the vertical edge 82 of the notch 78 which enables the connection between the drawer 10 and the mobile member 38. As a result, the mobile member 38 is translated by the movement of the drawer 10 in the direction of the arrow F (FIG. 1), and via the linkage 40 to the triangular support plates 36 for the drive spindles 34, the triangular plates 36 are rotated (FIGS. 5, 10) to the dash line position of FIG. 10. The movements of the drawer 10, the housing 12 and the mobile member 38 are coordinated by the connection and the linkage 40 in such a way that the drive spindles 34 are set to match the spacing of the reels of the small (Mini) size cassette 95 (FIG. 6) before the housing 12 comes in contact with the abutment 90 to power the lowering of the cassette 95. In such position, the roller 68 stays clear above the cassette 95. Simultaneously, the roller 66, undergoing the influence of the resilient means 74 is lowered with the cassette 95 and pushes it with the appropriate pressure onto its reference supports 24,26 and drive spindles (FIG. 8).

Figure 9:
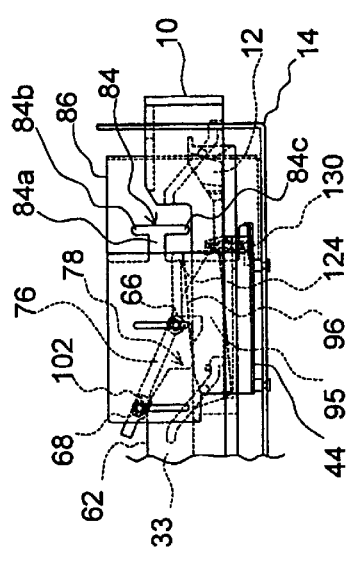
FIGS. 9 and 9A are detailed views of a specific element shown in two different positions.
Figure 9A:
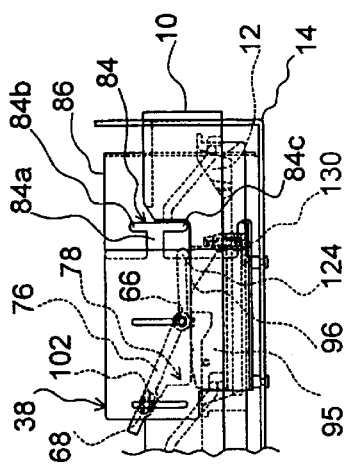

Turning now to FIGS. 9 and 9A, when a small (Mini) cassette 95 is in the recess 15 of the housing 12, the roller 66 enters the notches 78 and the lever 76 pivots around the roller 66 while the roller 68 actuates said lever 76 through an oblong aperture 102 (FIG. 12). At its free end 124, the lever has a rounded shape designed for cooperating temporarily with the upper surface 96 of the housing of the small cassette 95.

Should the unit be constructed to receive three different size cassettes by including another recess intermediate in size between the recess 15 and the location defined by the housing walls 13, and another abutment like the abutment 82, the main drawbacks are that (1) requiring a difference in bottom levels of the recesses would increase the height of the unit and (2) whatever the recess depth, the user could always mis-present the cassette, e.g. with the back end front as the cassette is perfectly symmetric. The centering mechanism including the centering tab 23 when present in such a multi-cassette system insures positioning and centering of the cassettes and makes it possible to reduce overall height of the apparatus because, for the centering mechanism to operate efficiently, the bottom levels of the recesses are required to be not very much apart, otherwise the centering tab 23 will fail to properly center the cassettes placed on the top levels, that is, the locations for the intermediate and largest size cassettes. In the apparatus as shown, designed for two cassettes, the housing 12 which has the size of the largest cassette insures its accurate centering as long as the cassette is properly located by the user while the centering mechanism serves the important function of checking orientation by the presence of the standard cavity, thereby determines whether the cassette is properly presented, and makes it possible to reduce overall height of the apparatus by allowing a very shallow recess 15.

In the DVC format, electronic memories are provided within each cassette 80,95 and contacts are provided at their rear end for engagement by a switch 130 mounted on the horizontal plate 44. However, it has been observed that, because of the resilience of the contacts of a standard switch 130, the cassette is not always horizontal near its operative position (FIG. 9) but tilted upon engagement by the switch contacts and thus playback/record quality or interface with the electronic memory can be hampered. To overcome such potential drawback, when the roller 66 moves downwards while the roller 68 stays on the upper edges 62 of the lateral walls 32,33 (FIG. 9) of the drawer 10, the lever 76 is fully pivoted and its end 124 pushes the rear end of the cassette 95 downwards to ensure proper engagement of the contacts of the switch 130 with those of the memory while keeping the cassette 95 perfectly horizontal. When the cassette is near its operative position (FIG. 9A), the roller 68 moves slightly downwards along the inclined edge of the notches 78 and thus pivots the lever 76 counter-clockwise so that its rear end 124 is clear of the cassette 95 as no pressure should be applied there in operative modes.

When any cassette 80,95 set in operative position (FIGS. 8, 9A), has to be ejected, the drawer 10 is translated in the opposite direction, for instance by reversing the polarity of the power supply to the electric micro-motor. At the beginning of this movement, the housing 12 is moved upwards and towards the drawer 10 as a result of the studs 28 sliding in the grooves 30 and thus clears the cassette 80,95 from its reference supports 24,26 and its drive spindles 34, and playback/recording means. Simultaneously, the rollers 66,68 are moved upwards (FIGS. 4, 6) and then, the drawer 10 being still translated, the rollers cooperate with the profiles 62 of its lateral walls 32,33, which bring them back to their inoperative level. Resilient means, of which one end is attached to the bottom plate 44 and the other end to the frame 14 or an abutment fixed on the drawer, translates the mobile member 38 back to the position as shown in FIG. 1 if a cassette 95 was in the operative position. Upon completing its translation, the drawer brings the cassettes 80,95 to their ejected position (FIG. 1) where they can be picked up by the user; to this end, additional openings can be provided in the lateral walls of the drawer 10 and the housing 12.

Instead of rollers 66,68 rods or bars can be utilized, in loading/unloading systems of the drawer type designed for a single size of cassette (for instance VHS unit), to keep the same existing parts and eventually fit them with appropriate parts for multi-cassette operation. The present invention also enables the loading/unloading systems and thus the units to keep their original height, that is to say the height corresponding to the large size cassette and, on another hand, the space that they occupy is not enlarged. Further, the traveling distance of the drawer is not increased at all.

What is claimed is:

1. A multi-cassette record and playback apparatus which is arranged to receive different size cassettes including a first size cassette having a pair of tape reels with a specific reel-center to reel-center spacing at a first distance, and a second size cassette having a pair of tape reels with a specific reel-center to reel-center spacing at a second distance, said record and playback apparatus comprising:
 a loading and unloading mechanism including a movable housing having a first defined location and a second defined location, the housing being movable horizontally inward and outward between loading and operative positions,
 a pair of tape-reel driving members,
 supports for said driving members, the supports being movable to vary a spacing of said driving members,
 a mobile member translatable horizontally inward and outward by the housing,
 a linkage between the mobile member and the supports for said driving members, wherein the linkage adjusts the supports to vary the spacing of said driving members responsive to horizontal translation of the mobile member by the housing,
 the mobile member having a first horizontal position wherein the spacing of said driving members is set by the linkage at the first distance and a second horizontal position wherein the spacing of said driving members is set by the linkage at the second distance, the first horizontal position being horizontally spaced from the second horizontal position, and
 a connection between the housing and the mobile member, the connection being one of
  (i) disabled during the inward movement of the housing to allow the mobile member to remain in the first horizontal position and
  (ii) enabled during the inward movement of the housing to cause the mobile member to be translated by the housing to the second horizontal position,
 the connection including an element carried by the mobile member, the element being maintained at one of a first level and a second level within the apparatus during the inward movement of the housing, the second level being vertically spaced from the first level,
 wherein when the element is maintained at the first level during the inward movement of the housing the connection is disabled and the spacing of said driving members is set at the first distance, and when the element is maintained at the second level during the inward movement of the housing the connection is enabled and the mobile member is translated by the housing to the second horizontal position to set the spacing of said driving members via the linkage at the second distance.

2. An apparatus according to claim 1 wherein the housing includes a lateral wall, and the element cooperates with the lateral wall during the inward movement of the housing to enable the connection.

3. An apparatus according to claim 2, wherein the lateral wall of the housing includes a notch forming an abutment, the abutment extending above the second level so that the element carried by the mobile member, when maintained at the second level, is engagable by the abutment during the inward movement of the housing to enable the connection between the housing and the mobile member.

4. An apparatus according to claim 3 wherein the abutment extending above the second level also extends below the first level so that the element, when maintained at the first level during the inward movement of the housing, stays clear of the abutment and the connection is disabled.

5. An apparatus according to claim 1 wherein the element comprises a resilient roller.

6. An apparatus according to claim 1 wherein the element, when maintained at the first level, locks the mobile member in the first horizontal position to prevent any movement thereof.

7. An apparatus according to claim 1 wherein the connection is enabled by the element being maintained at the second level and thereby located at a position engagable by an abutment carried by the housing during the inward movement of the housing.

8. An apparatus according to claim 1 wherein the element comprises two horizontally spaced pressure rollers.

9. An apparatus according to claim 8 wherein the rollers are guided by grooves provided in a lateral wall of the mobile member.

10. An apparatus according to claim 8 wherein the rollers are acted on by resilient members.

11. An apparatus according to claim 1 wherein the supports for the driving members comprise plates mounted to pivot about a common shaft toward and away from each other to vary the spacing of the driving members.

12. An apparatus according to claim 1 wherein the housing has peripheral walls defining the first defined location and defining the second defined location, the housing being movable to lower and raise the defined locations.

13. An apparatus according to claim 12 wherein the first defined location has a first bottom portion, and second defined location has a second bottom portion, the second bottom portion being located below the first bottom portion and the second level being located below the first level.

14. An apparatus according to claim 13 wherein the element comprises a roller, the roller supporting a pivotable lever, and the element further compries a second roller serving as a driver to pivot the lever downward during the inward movement of the housing.

15. An apparatus according to claim 13 wherein the element comprises a roller carried by the mobile member.

16. An apparatus according to claim 13, wherein the element comprises a roller carried by the mobile member and, when maintained at the second level during the, inward movement of the housing, roller is operable to enable the connection.

17. An apparatus according to claim 13 wherein the mobile member is retained in the first horizontal position and the connection is disabled when the element carried by the mobile member is maintained at the first level during the inward movement of the housing.

18. An apparatus according to claim 17, wherein the housing includes a notch forming an abutment, the abutment extending above the second level so that the element carried by the mobile member, when maintained at the second level during the inward movement of the housing, is engagable by, the abutment to enable the connection between the housing and the mobile member and, when maintained at the first level during the inward movement of the housing, clears the abutment whereby the connection is disabled.

19. An apparatus according to claim 18 wherein the abutment extends below the first level so that the element stays clear of the abutment and the connection is disabled when the element is maintained at the first level during the inward movement of the housing.

20. A multi-cassette record and playback apparatus which is arranged to receive cassettes of different size including a first size cassette having a pair of tape reels with a specific reel-center to reel-center spacing at a first distance, and a second size cassette having a pair of tape reels with a specific reel-center to reel-center spacing at a second distance, the record and playback apparatus comprising:
a pair of tape-reel driving members mounted on supports adjustable to vary a spacing of the driving members,
a housing movable inward and outward between loading and operative positions,
a mobile member translatable horizontally inward and outward by the housing,
a linkage between the mobile member and the supports,
the mobile member having a first position wherein the linkage sets the driving members at the first distance and a second position wherein the linkage sets the driving members at the second distance, the first position being horizontally spaced from the second position,
a connection between the housing and the mobile member,
the connection being one of enabled and disabled during the inward movement of the housing and including an element coupled to the mobile member, the element being maintained at one of a first level and a second level, the first level being vertically spaced above the second level,
a member carried by the housing including a notch forming an abutment extending above the second level and below the first level so that the element coupled to the mobile member, when maintained at the first level during the inward movement of the housing, stays clear of the abutment and the connection is disabled between the housing and the mobile member and the mobile member is located at the first position wherein the spacing of the driving members is set at the first distance, and the element, when maintained at the second level during inward the movement of the housing, is engagable by the abutment whereby the connection is enabled between the housing and the mobile member and the mobile member is translated by the housing to the second position thereby setting the spacing of the driving members via the linkage at the second distance.

21. A multi-cassette record and playback apparatus for different size cassettes including a first size cassette having a pair of tape reels with a specific reel-center to reel-center spacing at a first distance, and a second size cassette having a pair of tape reels with a specific reel-center to reel-center spacing at a second distance, the record and playback apparatus comprising:
a loading and unloading mechanism including a movable housing, the housing being movable horizontally inward and outward between loading and operative positions during loading and unloading operations,
a pair of cassette tape-reel driving members mounted on movable supports adjustable to vary a spacing of the driving members,
a mobile member translatable horizontally inward and outward by the housing,
a linkage between the mobile member and the supports, wherein the linkage, by moving the supports, adjusts the spacing of the driving members responsive to horizontal translation of the mobile member by the housing,
the mobile member having a first horizontal position wherein the spacing of the driving members is set by the linkage at the first distance and a second horizontal position wherein the spacing of the driving members is set by the linkage at the second distance, the first horizontal position being horizontally spaced from the second horizontal position, and
a connection between the housing and the mobile member, the connection being one of
(i) disabled during the inward movement of the housing to allow the mobile member to remain in the first horizontal position and
(ii) enabled during the inward movement of the housing to cause the mobile member to be translated by the housing to the second horizontal position,
the connection including an element carried by the mobile member, the element being maintained at one of a first level and a second level within the apparatus during the inward movement of the housing,
wherein, when the element is maintained at the first level during the inward movement of the housing, the connection is disabled and the spacing of the driving members is set at the first distance and, when the element is maintained at the second level during inward movement of the housing, the connection is enabled and the mobile member is translated by the housing to set the spacing of the driving members via the linkage at the second distance,
wherein the housing is lowered and raised during the loading and unloading operations,
wherein the element comprises two resilient rollers located so as to apply resilient pressure downward, and
wherein the two resilient rollers support a pivotable lever, one of the two rollers serving as a driver to pivot the lever downward when the housing is lowered to the operative position when the connection inenabled.

22. A multi-cassette record and playback apparatus which is adapted to receive different size cassettes including a first size cassette having a pair of tape-reels with a first specific reel-center to reel-center spacing at a first distance, and a second size cassette having a pair of tape-reels with a second specific reel-center to reel-center spacing at a second distance, the record and playback apparatus comprising:
a loading and unloading mechanism including a movable housing, the housing being movable horizontally inward and outward between loading and operative positions during loading and unloading operations, a pair of cassette-tape-reel driving members, adjustable supports carrying the driving members, the supports being movable to vary a spacing of the driving members, a mobile member translatable horizontally inward and outward by the housing, a linkage between the mobile member and the supports, wherein the linkage, by moving the supports, adjusts the spacing of the driving members responsive to horizontal translation of the mobile member by the housing, the mobile member having a first horizontal position wherein the spacing of the driving members is set by the linkage at the first distance and a second horizontal position wherein the spacing of the driving members is set by the linkage at the second distance, the first horizontal position being horizontally spaced from the second horizontal position, and a connection between the housing and the mobile member the connection being one of
(i) disabled during the inward movement of the housing to allow the mobile member to remain in the first horizontal position and
(ii) enabled during the inward movement of the housing to cause the mobile member to be translated by the housing to the second horizontal position, the connection including an element carried by the mobile member, the element being maintained at one of a first level and a second level vertically spaced from the first level during the inward movement of the housing, and wherein during the inward movement of the housing, when the element is maintained at the first level, the connection is disabled and the spacing of the driving members is set at the first distance and, when the element is maintained at the second level, the connection is enabled and the spacing of the driving members is set via the linkage at the second distance, wherein the housing is lowered and raised during the loading and unloading operations, wherein the element comprises a roller located so as to apply resilient pressure downward, and wherein the mobile member supports a pivotable lever, the roller serving as a driver to pivot the lever downward when the housing is lowered to the operative position when the connection is enabled.

23. A multi-cassette record and playback apparatus adapted to receive different size cassettes including a first size cassette having a predetermined thickness and a pair of tape reels with a first specific reel-center to reel-center spacing at a first distance, and a second size cassette having a predetermined thickness substantially equal to the predetermined thickness of the first size cassette and a pair of tape reels with a second specific reel-center to reel-center spacing at a second distance, the record and playback apparatus comprising:
loading and unloading mechanism including a movable housing,
the housing having a first defined location and a second defined location, the first defined location and the second defined location each having a bottom surface, the bottom surface of the first defined location being vertically spaced from the bottom surface of the second defined location,
the housing being movable horizontally inward and outward between loading and operative positions during loading and unloading operations,
a pair of tape-reel driving members mounted on supports adjustable to vary a spacing of the driving members when the housing is moved between the loading and operative positions during the loading and unloading operations,
a mobile member translatable horizontally inward and outward by the housing,
a linkage between the mobile member and the supports, wherein the linkage, by moving the supports, adjusts the spacing of the driving members responsive to horizontal translation of the mobile member by the housing,
the mobile member having a first horizontal position wherein the spacing of the driving members is set by the linkage at the first distance and a second horizontal position wherein the spacing of the driving members is set by the linkage at the second distance, the first horizontal position being horizontally spaced from the second horizontal position, and
a connection between the housing and the mobile member, the connection being one of
(i) disabled the during inward movement of the housing to allow the mobile member to remain in the first horizontal position and
(ii) enabled during the inward movement of the housing to cause the mobile member to be translated by the housing to the second horizontal position,
the connection including an element carried by the mobile member, the element being maintained during the inward movement of the housing at one of a first level and a second level, the first level being spaced from the second level, the first level being spaced above the bottom surface of the first defined location by said predetermined thickness of the first size cassette and the second level being spaced above the bottom surface of the second defined location by said predetermined thickness of the second size cassette wherein, when the element is maintained at one of the first level and the second level during the inward movement of the housing, the connection is disabled and the spacing of the driving members is set at the first distance and, when the element is maintained at the other of the first level and the second level, during the inward movement of the housing, the connection is enabled and the mobile member is translated by the housing to move the supports via the linkage and set the spacing of the driving members at the second distance.

24. A multi-cassette record and playback apparatus comprising:
a pair of tape-reel driving members mounted on supports, the supports being adjustable to vary a spacing of the driving members between a first distance and a second distance,
a movable housing which has a first defined location having a bottom surface, and a second defined location having a bottom surface, the housing being movable inward and outward between loading and operative positions,
a mobile member translatable horizontally inward and outward by the housing,
a linkage between the mobile member and the supports, wherein the linkage by moving the supports, sets the spacing of the driving members, the mobile member having a first position wherein the linkage sets the spacing of the driving members at the first distance and a second position wherein the linkage sets the spacing of the driving members at the second distance, the first position being horizontally spaced from the second position, and a connection between the housing and the mobile member, the connection being one of enabled and disabled during the inward movement of the housing and including an element carried by the mobile member, the element being maintained at one of a first level and a second level, the first level being spaced at a first predetermined dimension above the first defined location bottom surface and the second level being spaced a second predetermined dimension above the second defined location bottom surface and being vertically spaced from the first level, wherein when the element is maintained at the first level during the inward movement of the housing, the connection is disabled and the spacing of the driving members is set at the first distance, and when the element is maintained at the second level during the inward movement of the housing the connection is enabled and the mobile member is translated by the housing to set the spacing of the driving members at the second distance by moving the supports via the linkage.

25. A record and playback apparatus for at least one of a first cassette and a second cassette, wherein the first cassette has a first size including a first distance from reel-center to reel-center and wherein the second cassette has a second size including a second distance from reel-center to reel-center, the record and playback apparatus comprising:

a loading and unloading mechanism including a housing movable horizontally inwardly and outwardly, wherein the housing has a first defined location and a second defined location;

a pair of driving members mounted on supports, the supports being adjustable to vary a spacing of the driving members;

a horizontally movable mobile member;

a linkage between the mobile member and the driving member supports, the mobile member being movable between a first horizontal position, wherein the linkage spaces the driving members apart by the first distance, and a second horizontal position, wherein the linkage spaces the driving members apart by the second distance, the second horizontal position being horizontally spaced from the first horizontal position; and a connection between the housing and the mobile member, the connection being one of
(i) disabled during the inward movement of the housing to allow the mobile member to remain in the first horizontal position and
(ii) enabled during the inward movement of the housing to cause the mobile member to be translated by the housing to the second horizontal position, the connection including an element coupled to the mobile member, the element being movable between one of a first level above the first defined location and a second level vertically spaced from the first level and above the second defined location whereby, when the element is maintained at the first level during the inward movement of the housings the connection is disabled and the linkage spaces the driving members apart by the first distance and, when the element is moved to and maintained at the second level during the inward movement of the housing, the connection is enabled and the linkage spaces the driving members apart by the second distance.

26. A record and playback apparatus for at least one of a first cassette and a second cassette, wherein the first cassette has a first top surface and a first size including a first distance from reel-center to reel-center and the second cassette has a second top surface and a second size including a second distance from reel-center to reel-center and wherein the first cassette is receivable within the apparatus with the first top surface at a first level and the second cassette is receivable within the apparatus with the second top surface at a second level, the record and playback apparatus comprising:

a loading and unloading mechanism including a housing movable horizontally inwardly and outwardly, wherein the housing includes a first location and a second location;

a pair of driving members mounted on supports, the supports being adjustable to vary a spacing of the driving members;

a horizontally movable mobile member;

a linkage between the mobile member and the driving member supports, the mobile member being movable between a first horizontal position, wherein the linkage spaces the driving members apart by the first distance, and a second horizontal position, wherein the linkage spaces the driving members apart by the second distance, the second horizontal position being horizontally spaced from the first horizontal position; and a connection between the housing and the mobile member, the connection being one of
(i) disabled during the inward movement of the housing to allow the mobile member to remain in the first horizontal position and
(ii) enabled during the inward movement of the housing to cause the mobile member to be translated by the housing to the second horizontal position, the connection including an element carried by the mobile member and movable between the first level, wherein the connection is disabled during the inward movement of the housing and the driving members are spaced apart by the first distance, and the second level, wherein the connection is enabled during the inward movement of the housing and the driving members are spaced apart by the second distance.

* * * * *

UNITED STATES PATENT AND TRADEMARK OFFICE
CERTIFICATE OF CORRECTION

PATENT NO.    : 6,155,509
DATED         : December 5, 2000
INVENTOR(S)   : d'Alayer et al.

It is certified that error appears in the above-identified patent and that said Letters Patent is hereby corrected as shown below:

Column 10,
Line 63, delete "," (second occurrence);
Line 64, after "housing" insert -- the --;

Column 11,
Line 9, delete ",";
Line 57, after "and" insert -- so that --;
Line 58, change "inward the" to -- the inward --;

Column 12,
Line 57, change "inenabled" to -- is enabled --;

Column 13,
Line 22, after "member" insert -- , --;

Column 14,
Line 25, change "the during" to -- during the --;
Line 48, delete ",";
Line 60, delete ",";
Line 67, after "linkage" insert -- , --;

Column 16,
Line 6, change "housings" to -- housing, --.

Signed and Sealed this

Sixteenth Day of October, 2001

Attest:

*Attesting Officer*

NICHOLAS P. GODICI
*Acting Director of the United States Patent and Trademark Office*